(No Model.)
L. A. F. HERRMANN.
ELECTRIC CABLE OR CONDUCTOR.
No. 280,474. Patented July 3, 1883.
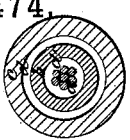
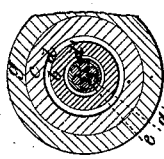
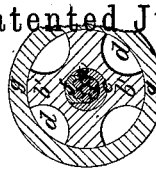
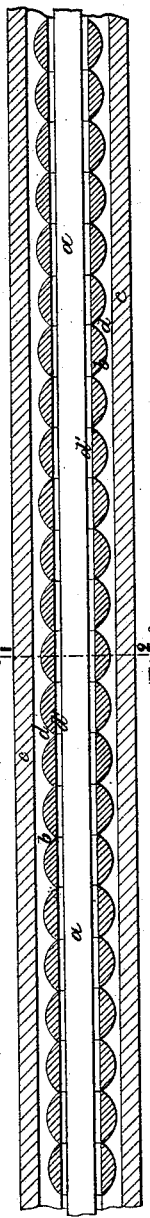
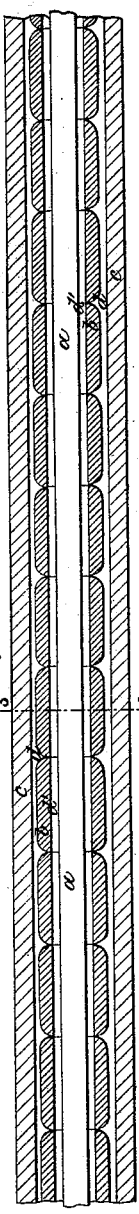
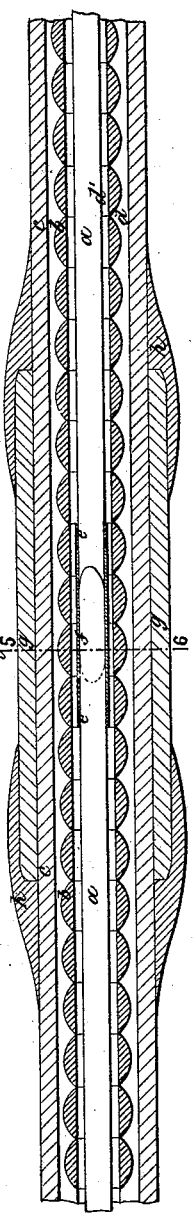
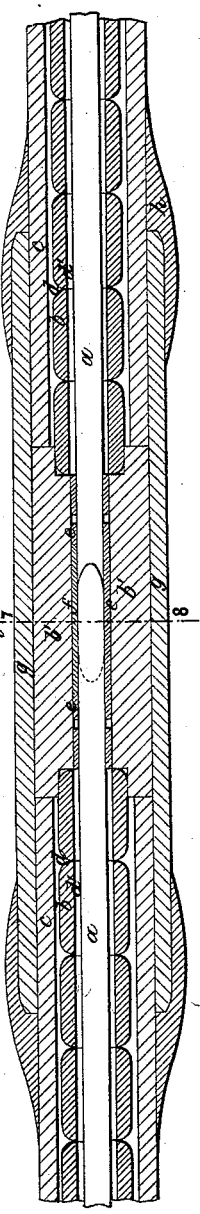
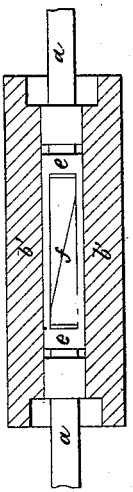
Witnesses
Inventor:

UNITED STATES PATENT OFFICE.

LOUIS ADOLPHE FORTIN HERRMANN, OF PARIS, FRANCE.

ELECTRIC CABLE OR CONDUCTOR.

SPECIFICATION forming part of Letters Patent No. 280,474, dated July 3, 1883.

Application filed March 16, 1883. (No model.)

*To all whom it may concern:*

Be it known that I, LOUIS ADOLPHE FORTIN HERRMANN, civil engineer, of the city of Paris, France, have invented a new and useful Improvement in Electric Cables or Conductors, of which the following is a full, clear, and exact description.

This invention relates to such a construction of the insulating-covering of electric conducting wires or cables that the wire or wires shall be bathed in a free circulation of air or gas, or even a liquid within an external envelope or tube. To this end the wire or cable is insulated and held in place within a tubular envelope or covering (which may be of conducting or non-conducting material) by stringing or threading upon the wire or cable short tubular pieces of insulating material having more or less the external form of beads, which leave spaces to allow of a free circulation of air or a gas around the wire or cable.

In order that the invention may be more readily understood, I have illustrated some examples of the same in the accompanying drawings.

Figure 1 is a longitudinal section of a cable composed of seven wires, and Fig. 2 a cross-section of same on line 1 2. Fig. 3 is a longitudinal section of a cable of seven wires, and Fig. 4 a cross-section of same on line 3 4. Fig. 5 shows the mode of splicing two lengths of cable; and Fig. 6, a cross-section of the splice, taken on line 5 6. Fig. 7 shows a modified form of splice; Fig. 8, a cross-section taken on line 7 8, and Fig. 9 a plan of same.

The same letters of reference denote the same parts in all the figures.

$a$ is the conducting wire or cable, upon which are strung short lengths or bead-like pieces $b$, of insulating material—such as wood, glass, enameled ware, or porcelain—which may be either round, as in Figs. 1, 2, 5, 6, or elongated, as in Figs. 3, 4, 7, 8, and of any size desired. The wire or cable, after being threaded through these bead-like pieces, is introduced into a tubular envelope, $c$, (which may or may not be of insulating material,) leaving vacant spaces $d$, in which air or gas (or it may be a liquid) may freely circulate.

Any number of wires or cables $a$, strung with insulating-beads or tubular pieces $b$, may be laid side by side and inclosed within the same envelope or tube, $c$, of sufficient diameter. The wires or cables may, before being strung with bead-like distance and insulating pieces $b$, receive one or more servings, and the envelope or tube may be sheathed, if desired.

The splicing of the wires is effected by introducing the ends, which are beveled off, so as to form a scarf-joint, into a small tube, $e$ $e$, of thin metal, Figs. 5 to 9, open on the upper side at $f$ $f$, for soldering the whole together with tin or silver. In Figs. 7, 8, and 9 the tube $e$ $e$ is shown as inclosed in a distance-piece, $b'$, which may be of the sectional form shown at Fig. 8, for example, against which the ends of the two tubes or envelopes $c$ abut; but in Figs. 5 and 6 this piece $b'$ is absent, the ends of tubes $c$ abutting together. In both cases the joint of the envelope $c$ is inclosed in a sleeve, $g$, soldered at $h$ $h$.

The form, dimensions, and details of the various parts may be varied without departing from the invention.

I claim—

1. The combination of the conductor $a$ with the non-conducting beads $b$, open or split metallic splice-tube $e$, and metallic plug $f$, of solder, and outer tube, $c$, substantially as herein shown and described.

2. The combination of the conductor $a$ with the non-conducting beads $b$, conducting splice-tube $e$ $f$, distance-piece $b'$, and outer tube, $c$, substantially as herein shown and described.

The foregoing specification of my improvements in electric cables or conductors signed by me this 21st day of February, 1883.

LOUIS ADOLPHE FORTIN HERRMANN.

Witnesses:
 E. P. MACLEAN,
 JEAN BAPTISTE ROLLAND.